(12) United States Patent
Hsu et al.

(10) Patent No.: US 6,993,924 B2
(45) Date of Patent: Feb. 7, 2006

(54) FLOATING LOOP SYSTEM FOR COOLING INTEGRATED MOTORS AND INVERTERS USING HOT LIQUID REFRIGERANT

(75) Inventors: John S. Hsu, Oak Ridge, TN (US); Curtis W. Ayers, Kingston, TN (US); Chester Coomer, Knoxville, TN (US); Laura D. Marlino, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/926,205

(22) Filed: Aug. 25, 2004

(65) Prior Publication Data

US 2005/0178148 A1   Aug. 18, 2005

Related U.S. Application Data

(60) Provisional application No. 60/544,289, filed on Feb. 12, 2004.

(51) Int. Cl.
*F25B 27/00* (2006.01)

(52) U.S. Cl. .............. 62/238.6; 62/259.2; 62/277
(58) Field of Classification Search .............. 62/238.6, 62/238.7, 259.2, 277, 278, 352
See application file for complete search history.

(56) References Cited

U.S. PATENT DOCUMENTS

| | | | |
|---|---|---|---|
| 4,667,480 A | 5/1987 | Bessler | |
| 4,979,371 A * | 12/1990 | Larson | 62/81 |
| 5,031,409 A * | 7/1991 | Johnson | 62/73 |
| 5,927,089 A | 7/1999 | O'Donnell | |
| 6,196,007 B1 * | 3/2001 | Schlosser et al. | 62/73 |
| 6,668,575 B2 * | 12/2003 | Stensrud et al. | 62/298 |

FOREIGN PATENT DOCUMENTS

WO   WO 01/40005   6/2001

* cited by examiner

*Primary Examiner*—William E. Tapolcai
(74) *Attorney, Agent, or Firm*—Kirk A. Wilson

(57) ABSTRACT

A floating loop vehicle component cooling and air-conditioning system having at least one compressor for compressing cool vapor refrigerant into hot vapor refrigerant; at least one condenser for condensing the hot vapor refrigerant into hot liquid refrigerant by exchanging heat with outdoor air; at least one floating loop component cooling device for evaporating the hot liquid refrigerant into hot vapor refrigerant; at least one expansion device for expanding the hot liquid refrigerant into cool liquid refrigerant; at least one air conditioning evaporator for evaporating the cool liquid refrigerant into cool vapor refrigerant by exchanging heat with indoor air; and piping for interconnecting components of the cooling and air conditioning system.

11 Claims, 4 Drawing Sheets

FLOATING LOOP SYSTEM FOR COOLING INTEGRATED MOTORS AND INVERTERS USING HOT LIQUID REFRIGERANT

CROSS REFERENCE TO RELATED APPLICATIONS

This application claims the benefit of U.S. Provisional Application 60/544,289, filed Feb. 12, 2004 herein incorporated by reference. This application is also related to U.S. Pat. No. 6,772,603, issued Aug. 10, 2004, and U.S. patent application Ser. No. 10/716,060 filed Nov. 18, 2003, both herein incorporated by reference in their entirety.

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is methods and apparatus for cooling of electrical devices and electronic components using vapor compression air conditioning systems in large systems such as an electric or hybrid vehicle.

DESCRIPTION OF THE BACKGROUND ART

For vehicles using electric motors and power electronic inverters, two-phase cooling with the coolant changed from the liquid phase to the vapor phase is far more effective than using single-phase such as liquid to liquid heat transfer. The significant latent heat associated with the two phase heat transfer is the reason for making two-phase cooling attractive. This type of cooling addresses the need for increased power density and associated higher heat fluxes in inverters and traction drive motors.

There are two cooling liquids available in an internal combustion engine vehicle. One is the 105° C. ethylene glycol/water supply obtained from the radiator. The other one is the 85° C. transmission oil. Strictly speaking, there is also refrigerant at high pressure available for passenger compartment air conditioning. Most people with the experience of their expensive household air-conditioning bills would have an impression that cooling the motors and inverters with a technology that is related to an air conditioning system would be impractical and expensive. This invention teaches that such a negative impression is not necessarily true when the floating-loop system is used to cool the motors and inverters in conjunction with the air-conditioning system of a vehicle.

The cooling of various loads in a vehicle is currently conducted in a piece-meal fashion. Separate cooling systems are used for the interior, the motor, the electronic devices, etc. To date, innovations in the thermal management of semiconductor devices utilized in power electronics have been relatively limited. Devices dissipating large quantities of heat have traditionally been restricted to passive cooling techniques, channel cooling, solid heat sinks, or fans. With the advent of larger, faster, higher current semiconductors efficient cooling methods are required to dissipate ever increasing densities of waste heat. It is estimated that 55% of electronic product failures are due to excessive temperatures. Universities and industry are currently working to develop new methods to provide thermal management to circuit board assemblies as well as individual silicon dies. Promising new technologies being examined include immersion, jet impingement, and spray cooling. Dielectric fluids with high heat capacities and advantageous electrical characteristics are being investigated to work with these new "wet" technologies. New thermosyphon cooling techniques are also beginning being applied to electronics at both board and individual chip levels.

A method of cooling silicon chips is being researched at Purdue University wherein semiconductors are immersed in a dielectric which vaporizes as the chips increase in temperature. The vapor condenses as it rises and is cooled by the water pipe, changes phase back to a liquid, and drops back into the pool. The temperature difference between the vapor and the liquid is negligible. For a lower vapor temperature, the water-cooled heat exchanger for a given heat extracted from the multichip modules is comparatively large.

Semiconductors are also being cooled through jet impingement. This technique, as well as spray cooling, is presently being investigated by multiple universities and industrial sources. In both cases the liquid is typically vaporized, cooled, returned to a liquid state and then recirculated.

A thermosyphon assembly developed by Hewlett Packard is utilized to implement a two-phase liquid cooling system by indirect contact with electronics. In this system the density difference between the liquid and vapor creates a pressure head, which drives the flow through the loop, and as such no additional driving force is needed. Hewlett Packard's assembly reportedly dissipates 80 W of heat from the PC processor.

Hewlett Packard has also expanded their inkjet printer technology to thermal management applications using phase change cooling. Using their existing inkjet knowledge-base they are able to precisely target specific areas of chips as well as control flow volume and rates. This technique allows spatial thermal control onto specific regions of the chip according to its heat level.

Research is also being performed in spray cooling semiconductor technologies at UCLA. Tests have been performed on cooling IGBT's with results of up to 34% improvement seen in their power handling capabilities. Water is being utilized as the coolant in these systems with the semiconductors being coated with a conformal dielectric. Additionally, UCLA's technology involves the construction of the nozzle array from silicon by reactive ion etching.

Isothermal Systems Research is developing thermal management of enclosed electronics at small system levels. Their thermal management applications also include the cooling of individual electronic devices.

The Laboratory for Physical Sciences located adjacent to the University of Maryland's College Park Campus, is a facility where university and federal government personnel collaborate on research. Faculty and students from the UMCP Departments of Physics, Electrical and Computer Engineering, and Materials and Nuclear Engineering conduct research at the LPS laboratories in various fields. The Thermal Management group at LPS is currently developing advanced spray cooling techniques for high-performance computing platforms. Their work includes individual chip cooling as well as circuit board and system level cooling.

Other companies are currently developing and marketing immersion and spray cooling thermal management systems. Modine Manufacturing, which acquired Thermacore in 2001, markets a broad range of loop thermosyphon and heat pipe cooling solutions to military and industrial users at both system and board levels. Heat pipe technology consists of a vacuum tight envelope, a wick structure and a working fluid. The heat pipe is evacuated and then back-filled with a small quantity of working fluid, just enough to saturate the wick. The atmosphere inside the heat pipe is set by equilibrium of liquid and vapor. As heat enters at the evaporator, this equilibrium is upset generating vapor at a slightly higher pressure. This higher pressure vapor travels to the condenser end where the slightly lower temperatures cause the vapor to condense giving up its latent heat of vaporization. The condensed fluid is then pumped back to the evaporator by the capillary forces developed in the wick structure. This continuous cycle transfers large quantities of heat with very low thermal gradients. A heat pipe's operation is passive, driven only by the heat that is transferred.

Thermacore is expanding their heat pipe cooling applications by embedding heat pipes into heatsinks for use under power semiconductors. For example heat pipes were embedded under each of eight power amplifier modules. The heat pipes were 0.375" in diameter flattened into grooves in the heat sink base with a thermal epoxy at the interface. This approach reduced the thermal resistance of the heat sink by 50%. Thermacore's cooling designs specifically geared towards power applications include loop thermosyphons where the circuit board is essentially immersed in the coolant and vapor chambers.

A vapor chamber is a vacuum vessel with a wick structure lining the inside walls that is saturated with a working fluid. As heat is applied, the fluid at that location immediately vaporizes and the vapor rushes to fill the vacuum. Wherever the vapor comes into contact with a cooler wall surface it will condense, releasing its latent heat of vaporization. The condensed fluid returns to the heat source via capillary action, ready to be vaporized again and repeat the cycle. The capillary action of the wick enables the vapor chamber to work in any orientation with respect to gravity. A vapor chamber heat sink consists of a vapor chamber integrated with cooling fins, pins, etc. Due to the way the vapor chamber operates, the heat source can be placed anywhere on the base without affecting its thermal resistance. In addition, there can be multiple heat sources dissipating the same or different amounts of power. The rate of fluid vaporization at each source will stabilize and the vapor chamber will be nearly isothermal. Thermacore is utilizing this technology in the cooling of power semiconductors.

The cooling approaches described above are solving thermal problems in a piece-meal fashion. This invention looks into the cooling and heating of the hybrid, fuel cell based, and full electric vehicles from a system approach. By doing so, individual components in the system may carry multiple functions. This results in a lower cost, smaller volume, and higher efficiency system.

SUMMARY OF THE INVENTION

A floating loop vehicle component cooling and air-conditioning system is taught comprising at least one compressor for compressing cool vapor refrigerant into hot vapor refrigerant; at least one condenser for condensing said hot vapor refrigerant into hot liquid refrigerant by exchanging heat with outdoor air, at least one floating loop component cooling device for evaporating said hot liquid refrigerant into hot vapor refrigerant, at least one expansion device for expanding said hot liquid refrigerant into cool liquid refrigerant, at least one air conditioning evaporator for evaporating said cool liquid refrigerant into cool vapor refrigerant by exchanging heat with indoor air; and piping for interconnecting components of said cooling and air conditioning system.

DETAILED DESCRIPTION OF THE PREFERRED EMBODIMENTS

Figure 1:
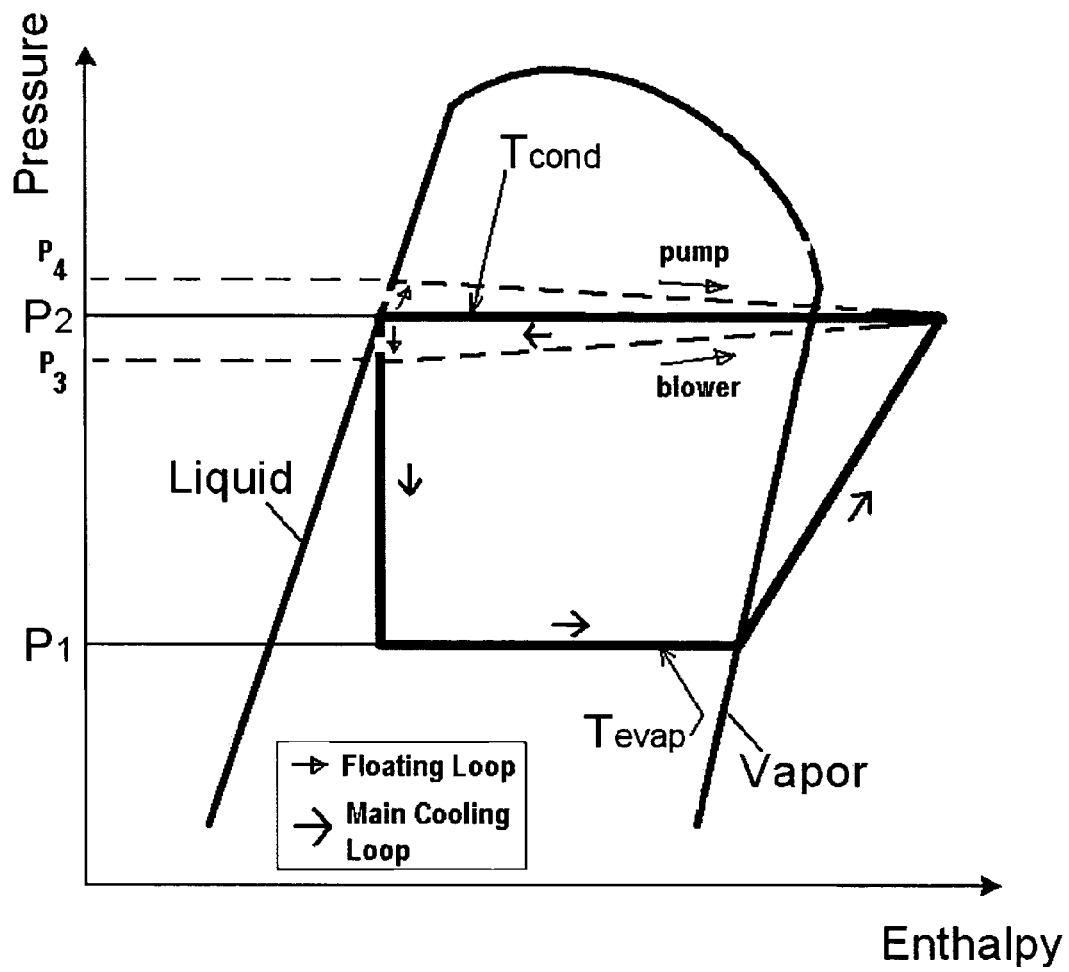
FIG. 1 is a pressure vs. enthalpy diagram of a vapor compression cycle in the invention.

In FIG. 1, the pressure versus enthalpy properties of a refrigerant for a refrigeration cycle is plotted. Starting from the upper left corner of the cycle, the refrigerant liquid at a high pressure $P_2$ and high temperature, $T_{cond}$, flows through an orifice or a capillary reducing its pressure to $P_1$. The vertical drop at the left-hand side of the cycle indicates a constant enthalpy process. The lower left corner of the cycle shows the beginning of the expansion process taking place in the. evaporator that gradually changes the liquid to vapor. The evaporator has a lower pressure $P_1$ and a lower temperature $T_{evap}$. When the refrigerant in the evaporator absorbs the heat the enthalpy of the refrigerant increases, as represented by the bottom horizontal line. At the lower right corner of the cycle the refrigerant enters a compressor. The refrigerant is compressed into a high-temperature vapor that follows a constant entropy line. At the upper right corner of the cycle the refrigerant starts to dissipate its heat in a condenser and gradually changes its phase to a liquid. This is indicated by the upper horizontal line of the cycle, with the process moving to the left.

The high energy requirement of the compressor of a conventional air conditioning system is mainly caused by the pressure difference, $P_1-P_2$ that the compressor has to overcome in order to produce a low temperature at the evaporator side. For cooling motors and inverters the liquid at the condenser side temperature is cold enough. Therefore, it is not necessary to have a significant pressure difference between the evaporator and condenser thus the instant invention only requires a very small pump or fan to move the fluid through the floating two-phase cooling sub-system. Whereas, a thermosyphon depends on liquid weight for the circulation and this requires a level installation. The cooling density of the thermosyphon is not high, i.e. a low heat flux per unit volume, and also would require separate cooling and condensing components be added to the system. The technology given in this invention overcomes the problems of the thermosyphon but retains its advantage of low power consumption. FIG. 1 shows the floating loop pressure-enthalpy relationship for the subject invention configurations with a liquid pump or a vapor blower. The pressure $P_4$ is very slightly above the $P_2/T_{cond}$ line, and this indicates use of a small liquid pump in the floating loop to move the fluid. $P_3$ is very slightly below the $P_2/T_{cond}$ line, indicating the system uses a vapor blower to move the fluid through the loop. In either case, the differential pressure ($P_4-P_2$, or $P_2-P_3$) is very small, which indicates a low energy requirement to operate the additional "floating" cooling loop.

Figure 2:
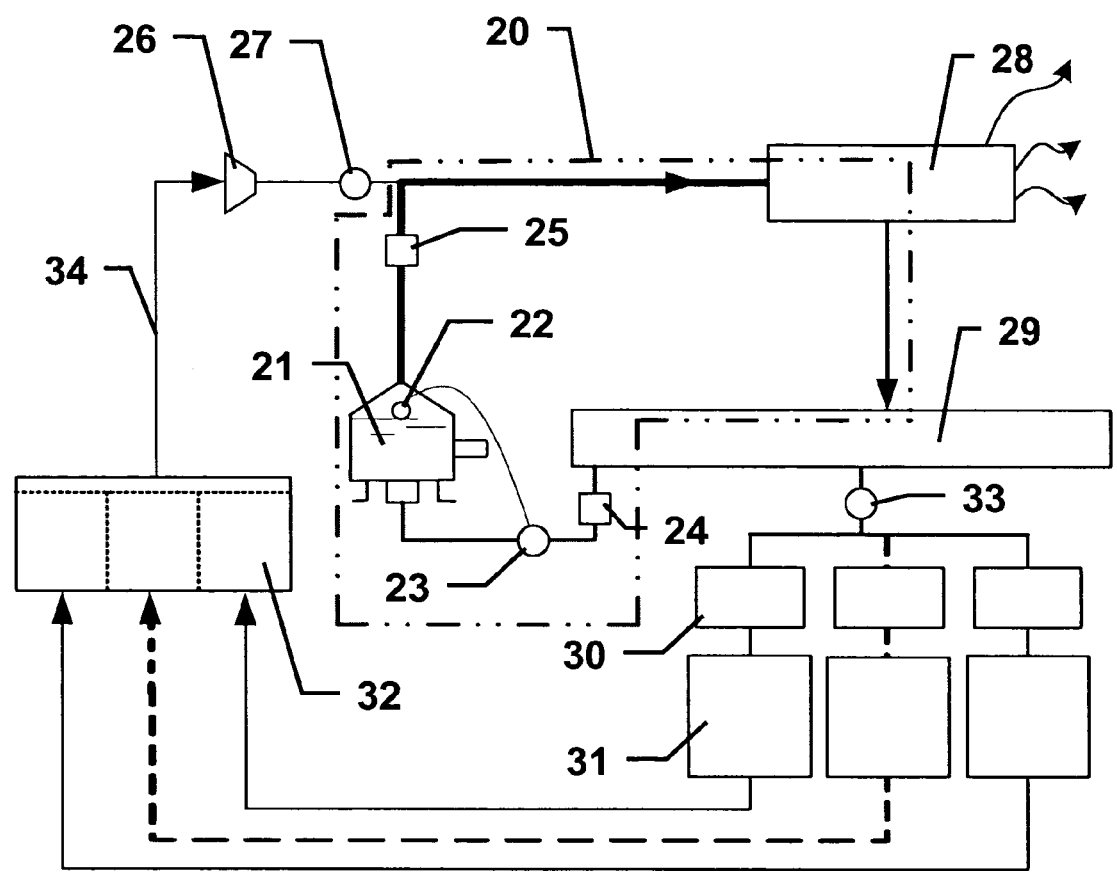
FIG. 2 is a schematic diagram showing elements of an embodiment of the invention.
Figure 3:
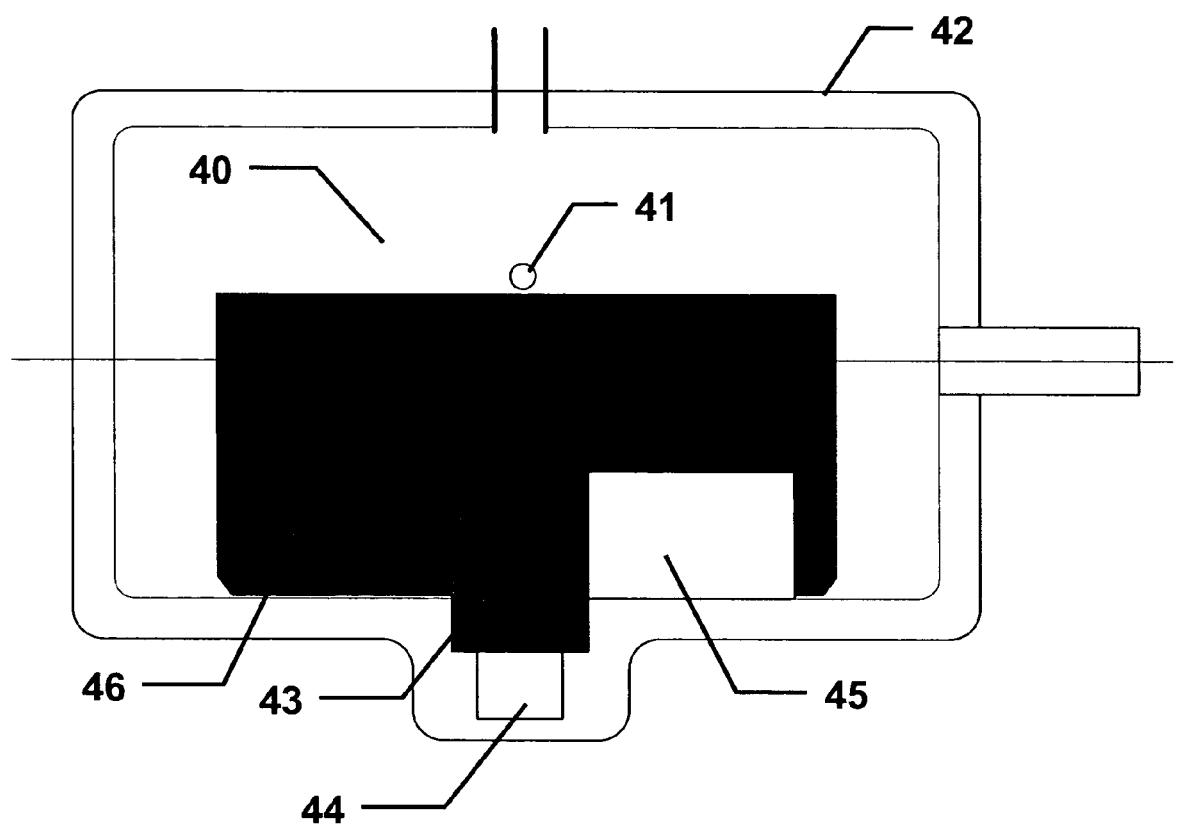
FIG. 3 is a schematic of a flooded jacket heat exchanger embodiment of the invention.
Figure 4:
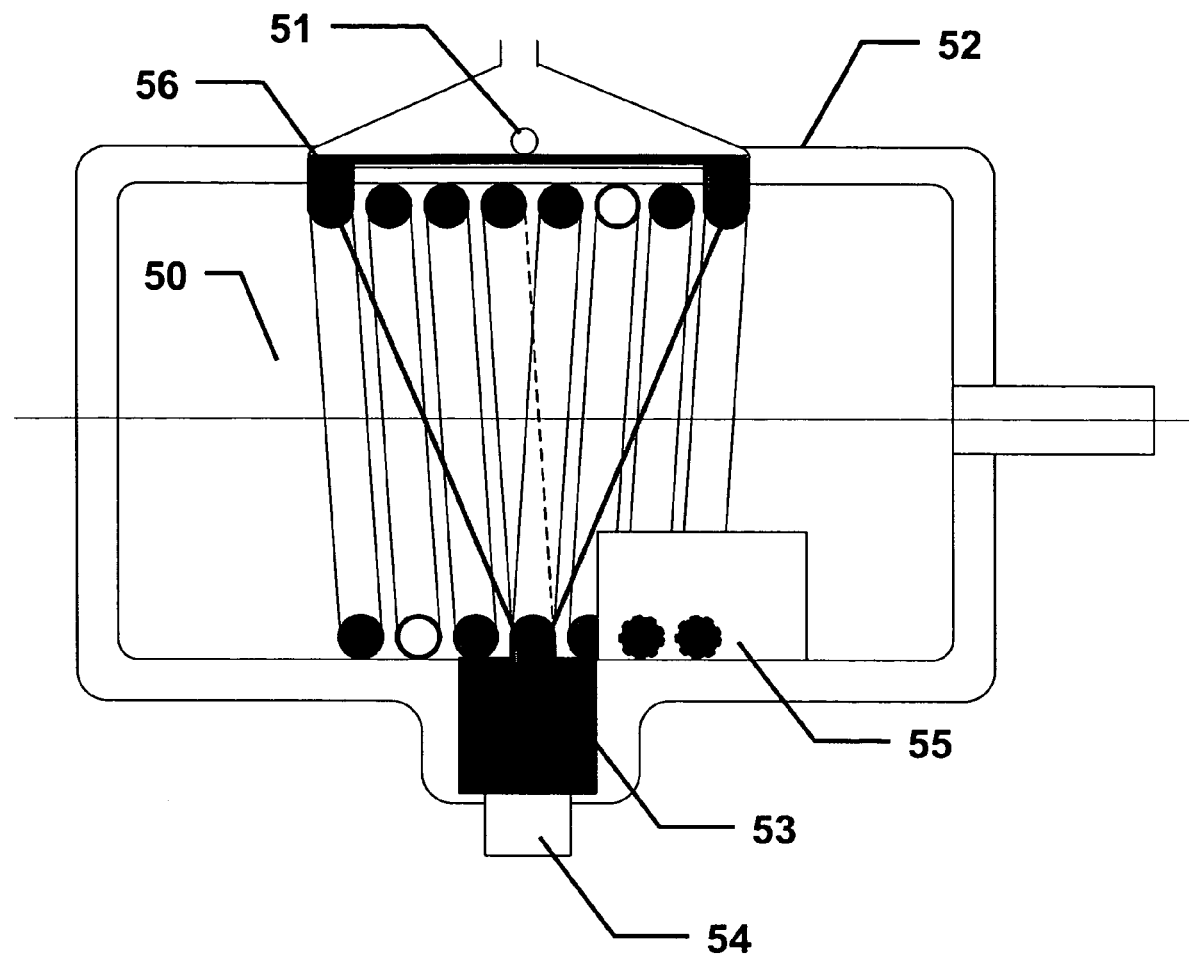
FIG. 4 is a schematic of distributor jacket heat exchanger embodiment of the invention.

FIG. 2 shows an embodiment of the system of this invention. The refrigerant vapor compression floating loop 20 is used to cool the integrated motor/inverter 21 and associated electronic components by tapping into hot liquid refrigerant at the refrigerant reservoir 29 and using an optional pump 24 to pump the hot liquid refrigerant through a heat exchanger as shown in FIGS. 3 and 4. An optional level sensor 22 and liquid level cutoff valve 23 controls the liquid refrigerant level in the heat exchanger. An optional floating loop blower 25 pumps the refrigerant vapor into the vapor compression cycle. The heat from the integrated motor converter 21 evaporates the hot liquid refrigerant thereby delivering hot vapor refrigerant into the vehicle air-conditioning system. The air-conditioning compressor 26 pumps the hot vapor through an optional unidirectional valve 27 and into the condenser 28 where the heat is dumped to atmosphere resulting in hot liquid refrigerant. The hot liquid refrigerant collects in the refrigerant reservoir 29 and a portion of the hot refrigerant liquid not used in the floating loop passes through a valve 33 and is expanded in an orifice 30 or other suitable expansion device to generate cool liquid refrigerant for the evaporator 31. Heat is transferred to the refrigerant in the evaporator 31 thereby cooling the indoor or vehicle cabin air and generating hot vapor refrigerant that passes through pressure controls 32 into the suction side of the air-conditioning compressor 26. All devices are interconnected using refrigerant piping 34.

FIG. 3 is an example of a flooded jacket heat exchanger used to cool the integrated motor/inverter 40. Hot liquid refrigerant 46 is flooded into a jacket at least partially surrounding the integrated motor/inverter 40. A refrigerant level sensor 41 controls the amount of liquid refrigerant in the jacket. Power electronic switching dies 43 are also liquid refrigerant cooled. Capacitors 45 are outside of the pressurized cooling zone but proximate the heat exchanger thereby receiving conductive cooling from the heat exchanger jacket. Power and control wiring passes through a terminal 44. An optional thermal coating 42 is applied to the integrated motor/inverter 40.

FIG. 4 is another embodiment using a distributor jacket with cooling tubes as the heat exchanger for cooling the integrated motor/inverter 50. Hot liquid refrigerant 56 is flooded into a distributor jacket at least partially surrounding the integrated motor/inverter 50. A refrigerant level sensor 51 controls the amount of liquid refrigerant in the jacket. Power electronic switching dies 53 are also liquid refrigerant cooled. Capacitors 55 are outside of the pressurized cooling zone but proximate the heat exchanger thereby receiving conductive cooling from the heat exchanger. Power and control wiring passes through a terminal 54. An optional thermal coating 52 is applied to the integrated motor/inverter 50.

FIGS. 4 and 5 show motor/inverter geometries that provide an integrated fluid chamber, allowing drain-back of liquid to the power inverter. This technique provides liquid submersion of the power electronics dies for cooling during and after the initial startup of the system when no refrigerant is yet flowing.

For total cooling management, instead of a piece-meal approach, a central compressor, condenser, and refrigerant reservoir are used. The refrigerant from the reservoir is distributed through different orifices or capillary tubes and valves to various objects. The object can be an inverter, a motor, an evaporator such as the evaporator for the interior air conditioning, etc. The back pressures of the objects are individually regulated by the pressure controller for maintaining the proper temperature of each object.

Unique technical features of the invention include: 1) floating refrigeration loop technology where lower amounts of energy are needed for cooling the motors and inverter/converters; 2) a total thermal management system that uses a floating refrigeration loop floating within the conventional air-conditioning refrigeration loop wherein components and refrigerant are shared; 3) the motors and inverter/converters are integrated and cooled in the floating loop. For example, it is possible to integrate the motor and the inverter/converter wherein the frame of the motor is used as an evaporator. Three zones of cooling (i.e. liquid, vapor, and non-pressurized zones) are used for cooling. The non pressurized zone is used to cool the capacitors and other inverter/converter components that are not suitable for the pressurized environment; 4) a total thermal management system that shares a compressor and condenser for cooling multiple objects at different temperatures; 5) a total thermal management system that controls fluid flow and back pressure to regulate temperature for the specific component; 6) the liquid level is controlled using a level sensor; 7) the level sensor can be optional if the optional pump is used in the floating loop when no small compressor is included in the floating loop; 8) the system can be operated when the vehicle is tilted.

While there has been shown and described what are at present considered the preferred embodiments of the invention, it will be obvious to those skilled in the art that various changes and modifications can be made therein without departing from the scope.

We claim:

1. A floating loop vehicle component cooling and air-conditioning system, comprising:
   at least one compressor for compressing cool vapor refrigerant into hot vapor refrigerant;
   at least one condenser for condensing said hot vapor refrigerant into hot liquid refrigerant by exchanging heat with outdoor air,
   at least one floating loop component cooling device for evaporating said hot liquid refrigerant into hot vapor refrigerant,
   at least one expansion device for expanding said hot liquid refrigerant into cool liquid refrigerant,
   at least one air conditioning evaporator for evaporating said cool liquid refrigerant into cool vapor refrigerant by exchanging heat with indoor air; and
   piping for interconnecting components of said cooling and air conditioning system.

2. The floating loop vehicle component cooling and air-conditioning system of claim 1 wherein said floating loop component cooling device further comprises at least one device selected from the group consisting of integrated motor/inverter, heat exchanger, power electronic switching dies, and capacitors.

3. The floating loop vehicle component cooling and air-conditioning system of claim 2 wherein said heat exchanger further comprises a hot liquid refrigerant flooded cooling jacket.

4. The floating loop vehicle component cooling and air-conditioning system of claim 2 wherein said heat exchanger further comprises a hot liquid refrigerant distributor with cooling tubes.

5. The floating loop vehicle component cooling and air-conditioning system of claim 2 wherein said integrated electric motor/inverter further comprises an AC motor.

6. The floating loop vehicle component cooling and air-conditioning system of claim 5 wherein said AC motor is a three-phase induction motor or a single-phase motor.

7. The floating loop vehicle component cooling and air-conditioning system of claim 2 wherein said integrated electric motor/inverter further comprises a brushless DC motor.

8. The floating loop vehicle component cooling and air-conditioning system of claim 1 wherein said floating loop component cooling device further comprises a refrigerant level sensor.

9. The floating loop vehicle component cooling and air-conditioning system of claim 1 wherein said floating loop component cooling device further comprises a refrigerant pump.

10. The floating loop vehicle component cooling and air-conditioning system of claim 1 wherein said floating loop component cooling device further comprises a floating loop blower.

11. The floating loop vehicle component cooling and air-conditioning system of claim 1 wherein said floating loop component cooling device further comprises a floating loop liquid level cutoff valve.

* * * * *